(12) United States Patent
Heuft et al.

(10) Patent No.: US 12,723,990 B2
(45) Date of Patent: Sep. 1, 2026

(54) METHOD AND APPARATUS FOR INSPECTING FULL CONTAINERS

(71) Applicant: HEUFT SYSTEMTECHNIK GMBH, Burgbrohl (DE)

(72) Inventors: Bernhard Heuft, Remagen (DE); Jörg Nonnen, Vettelschoss (DE)

(73) Assignee: HEUFT SYSTEMTECHNIK GMBH, Burgbrohl (DE)

( * ) Notice: Subject to any disclaimer, the term of this patent is extended or adjusted under 35 U.S.C. 154(b) by 181 days.

(21) Appl. No.: 18/569,322

(22) PCT Filed: Jun. 9, 2022

(86) PCT No.: PCT/EP2022/065732
§ 371 (c)(1),
(2) Date: Dec. 12, 2023

(87) PCT Pub. No.: WO2022/263292
PCT Pub. Date: Dec. 22, 2022

(65) Prior Publication Data
US 2024/0280504 A1 Aug. 22, 2024

(30) Foreign Application Priority Data
Jun. 15, 2021 (DE) .................... 10 2021 115 493.6

(51) Int. Cl.
*G01N 21/90* (2006.01)
*G01N 21/41* (2006.01)
*G01N 21/88* (2006.01)

(52) U.S. Cl.
CPC ............ *G01N 21/90* (2013.01); *G01N 21/41* (2013.01); *G01N 21/8806* (2013.01); *G01N 2021/8841* (2013.01); *G01N 2021/8845* (2013.01)

(58) Field of Classification Search
CPC .... G01N 21/90; G01N 21/41; G01N 21/8806; G01N 21/9027; G01N 2021/8841; G01N 2021/8845
See application file for complete search history.

(56) References Cited

U.S. PATENT DOCUMENTS 4,025,202 A 5/1977 Deane
4,459,023 A 7/1984 Reich et al.
(Continued)

FOREIGN PATENT DOCUMENTS

CH 601795 A5 7/1978
CH 686616 A5 5/1996
(Continued)

OTHER PUBLICATIONS

Totsuka "Foreign Object Inspection Apparatus", Mar. 18, 2019, WO2019059097 A1 (Year: 2019).*
(Continued)

*Primary Examiner* — Sang H Nguyen
(74) *Attorney, Agent, or Firm* — Leydig, Voit & Mayer, Ltd.

(57) ABSTRACT

A method for inspecting filled containers for foreign bodies, comprising: providing a planar illuminating device designed to emit radiation which radiates through a container to be examined; providing a detection device designed to detect the radiation which was emitted by the illuminating device and has radiated through the container and to create a photograph of the container on the basis of the detected radiation; providing an evaluation device designed to evaluate the image created by the detection device; wherein the detection device is aimed, at an acute angle α relative to the horizontal, at the bottom region of the container to be
(Continued)

inspected, and wherein a foreign body on the container bottom is recognized as a local disturbance in the imaging photograph.

10 Claims, 7 Drawing Sheets

(56) References Cited

U.S. PATENT DOCUMENTS

| | | | | |
|---|---|---|---|---|
| 4,492,475 | A | 1/1985 | Takahashi | |
| 5,486,693 | A | 1/1996 | Achter et al. | |
| 5,699,162 | A * | 12/1997 | Pirani | G01N 21/9018 356/239.5 |
| 5,729,340 | A * | 3/1998 | Griesbeck | B07C 5/122 356/240.1 |
| 6,239,869 | B1 * | 5/2001 | Heuft | G01N 21/9018 356/239.5 |
| 6,285,451 | B1 * | 9/2001 | Herron | G01B 11/06 250/559.27 |
| 7,010,863 | B1 * | 3/2006 | Juvinall | G01N 21/9045 33/522 |
| 2005/0225752 | A1 * | 10/2005 | Takai | G01N 21/4795 356/237.1 |
| 2010/0220919 | A1 | 9/2010 | Leclerc et al. | |
| 2014/0098365 | A1 * | 4/2014 | Kurosawa | G01N 21/9054 356/240.1 |
| 2018/0143143 | A1 * | 5/2018 | Coetzee | G01N 21/9027 |
| 2019/0056332 | A1 * | 2/2019 | Pinto | G01B 5/0004 |

FOREIGN PATENT DOCUMENTS

| | | | |
|---|---|---|---|
| DE | 29706425 | U1 | 8/1998 |
| DE | 19823735 | A1 | 3/1999 |
| DE | 10140010 | A1 | 3/2003 |
| DE | 102010018824 | A1 | 11/2011 |
| DE | 102014216188 | A1 | 2/2016 |
| DE | 102019208295 | A1 | 12/2020 |
| DE | 102019208299 | A1 | 12/2020 |
| JP | H02-114158 | A | 4/1990 |
| JP | 2004-317426 | A | 11/2004 |
| JP | 2005-257492 | A | 9/2005 |
| JP | 2012-122912 | A | 6/2012 |
| JP | 2019-053000 | | 4/2019 |

OTHER PUBLICATIONS

Buchwald et al "Detection System And Inspection Method For Bottle Seam And Embossing Alignment", Jan. 26, 2012, DE 102010032166 A1 (Year: 2012).*

Napravnik "Device And Method For The Production Of Container Combinations", Nov. 12, 2014, EP 2801533 A1 (Year: 2014).*

European Patent Office, International Search Report in International Patent Application No. PCT/EP2022/065732 (Sep. 23, 2022).

German Patent Office, Search Report in German Patent Application No. 10 2021 115 493.6 (Jan. 26, 2022).

European Patent Office, Written Opinion of International Searching Authority in International Patent Application No. PCT/EP2022/065732 (Sep. 23, 2022).

* cited by examiner

METHOD AND APPARATUS FOR INSPECTING FULL CONTAINERS

CROSS-REFERENCE TO RELATED APPLICATIONS

This application is the U.S. national phase of the International Patent Application No. PCT/EP2022/065732 filed Jun. 9, 2022, which claims the benefit of German Patent Application No. 10 2021 115 493.6 filed Jun. 15, 2021, the entire content of which is incorporated herein by reference.

FIELD

The disclosure relates to a method and a device for inspecting filled containers for foreign objects, comprising a planar illumination device, a detection device and an evaluation device, wherein the detection device is aimed, at an acute angle relative to the horizontal, at the bottom area of the container to be inspected.

BACKGROUND

Disclosed embodiments are intended in particular for use in automatic filling plants in the beverage, food and pharmaceutical industries, in which containers are transported at high speeds of up to 90,000 bottles per hour. Here, the containers are guided on transport devices which usually comprise a circulating conveyor belt or a circulating link chain.

In particular, an embodiment is intended for the inspection of filled containers. In automatic filling plants, filled containers are inspected for possible contaminants or foreign objects after filling. Typical foreign objects are glass splinters that are produced and introduced into the container during upstream container treatment steps, for example during cleaning, during filling or during the closing process. Such glass splinters cannot be adequately identified using conventional methods.

Furthermore, the containers must be lifted off the transport equipment for inspection, in particular for bottom inspection, so that the container bottom can be detected by radiation. This requires additional equipment, which complicates the overall design of the inspection device.

SUMMARY

Disclosed embodiments increase the reliability of a device for inspecting filled containers for foreign objects and, in particular, to reliably detect foreign objects located at the bottom of filled containers. At the same time, it is desirable to reduce the complexity of the inspection device.

According to an embodiment, a method for inspecting filled containers for foreign objects is proposed, comprising the provision of a planar illumination device which is configured to emit radiation which radiates through a container to be inspected, the provision of a detection device which is configured to detect the radiation which was emitted by the illumination device and has radiated through the container and to create an image of the container on the basis of the detected radiation, and the provision of an evaluation device which is configured to detect the radiation which has been emitted by the illumination device and has radiated through the container and to create an image of the container on the basis of the detected radiation, and to provide an evaluation device which is configured to evaluate the image created by the detection device. The detection device is aimed, at an acute angle relative to the horizontal, at the bottom area of the container to be inspected. A foreign object located at the bottom of the container is detected as a local disturbance in the image recording.

Disclosed embodiments make use of several effects which, surprisingly, lead to the bottom inspection of filled containers being carried out with increased reliability.

On the one hand, a filled transparent container has the optical effect of a cylindrical lens. Light that is visible in the transmitted light image of a filled container and has illuminated the entire cross-section of the container originates from a relatively small area around the focal point or around the focal line of the container cylindrical lens. A comparatively narrow illumination optic with high light intensity can therefore be used. The illumination device is imaged into the camera as a cylindrical lens through the filled bottle. As the width of the illumination device is smaller than the container to be inspected or the diameter of the container to be inspected, this also prevents interfering light from passing directly past the bottle and directly into the detection device. Interfering reflections from neighboring containers also do not occur. This results in a considerably higher signal-to-noise ratio between the useful light through the bottle and interfering incident or reflected light components.

Another optical effect was also observed, which is particularly important when inspecting the bottom of filled containers. If the camera is pointed at the bottom of a container from above at an acute angle, total reflection occurs at the bottom edge of the container bottom. As a result, the entire surface of the bottom is illuminated, even though there is a normal plastic or metal chain underneath the container on which the container is being transported.

Foreign objects on the container bottom, in particular transparent glass splinters or defects in the container wall, additionally lead to light refraction effects and to recognizable disturbance in the image created by the detection device. Such disturbances can be detected and classified.

Disclosed embodiments can be used to inspect containers made of any transparent material. The present method is particularly suitable for inspecting glass containers such as clear glass bottles, colored glass bottles and transparent plastic containers such as PET bottles.

The planar illumination device preferably has a width that is smaller than the width or diameter of the containers to be inspected. For this purpose, the width of the illumination device can advantageously be adapted to the respective inspection task. Typically, bottles used in the beverage industry are cylindrical and have a diameter of between about 5 and 15 cm. Containers used in the pharmaceutical industry, on the other hand, can be significantly smaller and have diameters of between about 1 and 3 cm. The planar illumination device can therefore preferably have a width of less than 4 cm, more preferably less than 2 cm and particularly preferably less than 1 cm.

The planar illumination device can preferably have a width of 10 to 90% of the diameter of the container to be inspected. The planar illumination device can preferably have a width of 20 to 80% of the diameter of the container to be inspected. The planar illumination device can preferably have a width of 30 to 70% of the diameter of the container to be inspected.

Disclosed embodiments can be used to inspect containers with different shapes. Irrespective of the shape of the containers, the diameter is understood to be the dimension which has the smallest size. If the illumination device has a smaller width than the diameter of the container defined in this way, it is ensured that no light can bypass the container and enter the detection device directly.

The height of the illumination device can also be advantageously adapted to the respective inspection task. The height of the planar illumination device can be selected so that it corresponds approximately to the height of the containers to be inspected. The planar illumination device can have a height of less than 30 cm, preferably less than 25 cm and particularly preferably less than 15 cm.

Preferably, the height and/or width of the emitting surface of the illumination device are adjustable and can be adapted to the respective container size. For this purpose, an aperture can be provided that limits the emitting surface of the illumination device. Such an aperture can be motor-adjustable so that the aperture is automatically adapted to the size of the containers to be inspected, for example when the inspection device is initialized.

The illumination device is preferably adapted to emit electromagnetic radiation. The illumination device is also preferably adapted to emit light in the visible range. The illumination device can also be configured to emit UV or infrared light or a combination thereof. Infrared radiation can advantageously be used for colored containers, in particular for brown glass bottles.

The illumination device can be designed as a planar light source that emits essentially monochrome, for example white visible light.

The planar illumination device can also have a plurality of individual radiation sources. These radiation sources can be LEDs, LCDs or OLEDs. In this case, the individual radiation sources of the illumination device can also be controlled as a function of the container shape, so that the size of the emitting surface of the illumination device can be varied.

Inspection accuracy can be further increased by using an illumination device that has illumination areas with different radiation characteristics. For example, the illumination device can be configured to generate color-coded illumination. Color-coded illumination means that the illumination has any geometric color pattern. Glass splinters or chipped glass cause light refraction. This refraction changes the local color tone in the image created by the detection device. In cases where the total reflection alone only leads to relatively small changes in the intensity of the image recording, local changes in the color tone can still be used to draw conclusions about foreign objects or defects on the container bottom.

The color-coded illumination can, for example, be a striped pattern consisting of a plurality of horizontal illumination strips arranged one above the other, with the illumination strips each emitting light of a different color. The light strikes the bottom of the container at different angles, where it is totally reflected and deflected into the detection device. Due to a glass splinter or chipped glass on the bottom of the container, the total reflection is disturbed and light is refracted, which changes the color composition of the radiation detected by the detection device. This property, which changes the color tone, makes it possible to detect such defects at the bottom of the container, which would otherwise not be detectable in the image recording solely through differences in contrast and transparency.

To generate color-coded illumination, a colored foil can be provided in the beam path between the illumination device and the container to be inspected. The colored foil then has a colored pattern forming the individual illumination areas.

The color-coded illumination can be configured to be particularly flexible if the planar illumination device has a plurality of individual radiation sources such as the LEDs or OLEDs mentioned above. In particular, if the illumination device consists of multicolored LEDs and UV LEDs, a predefined color-coded illumination can be set via software parameterization. However, any color pattern can be set.

In addition, a diffuser can be used to obtain soft color gradients between the individual illumination areas. This can further increase the sensitivity of the device.

The illumination device can also be formed by a beamer or a projector. A beamer has the advantage that any color pattern can be predefined by the software. This allows color patterns to be used in a targeted manner that are specially adapted to specific container shapes. Special patterns can therefore be used, particularly for individual bottles, which are frequently used nowadays. Such patterns can then, for example, be particularly suitable for inspecting individual bottles with certain embossings.

The illumination areas do not necessarily have to be configured to emit different colors. Alternatively or additionally, the illumination areas can also differ in terms of other emission characteristics. In addition to the emitted color, the different illumination areas can also differ from one another in terms of the polarization, intensity and/or phase of the emitted light. The color coding is only given here as an example of these emission characteristics and described in more detail.

The illumination device can be operated in pulsed mode and controlled in such a way that the radiation pulses are only emitted when a container to be inspected is located in front of the illumination device. Alternatively, the illumination device can also be operated continuously.

The detection device is preferably a commercially available color camera, in particular a semiconductor camera. Infrared and UV cameras can also be used. In order to avoid or reduce motion blur, shutter cameras with short shutter speeds can be used. This is particularly advantageous if the illumination device is operated continuously.

Preferably, the detection device detects one image of each container to be inspected. This ensures a high inspection speed. Alternatively, the detection device can detect a plurality of images of each container to be inspected. The images can be detected with a time delay, for example with a time delay of 100 μs to 1000 μs, preferably around 300 μs. The time-shifted images are preferably detected as a function of the transport speed of the containers to be inspected. Since three-dimensional container structures such as decorative elements generate light scattering, time-shifted images can better reveal the local color contrast occurring in the area of decorative elements. It is also conceivable to provide a plurality of detection devices, each of which is configured to detect at least one image of the container to be inspected. Preferably, the detection devices are arranged in such a way that they can take images of the container to be inspected from different imaging directions.

If several images are taken of the container to be detected, the illumination device can be controlled between the different images so that the illumination can be modified between the images. An individual color pattern can thus be generated for each image. For example, the colors emitted by the illumination areas can be changed. Alternatively or additionally, the shape of the illumination areas can be varied. For example, vertical strip-shaped illumination areas could be used for a first image, while horizontal strip-shaped illumination areas could be used for a second image. This allows different three-dimensional structures, for example vertical or horizontal structures, to be optimally emphasized.

The camera is usually used to create a color image of the container in RGB color space. The evaluation device is advantageously configured to convert the image of the container to be inspected created by the detection device into an image in HSV or HSL color space. The HSV color space results in a color value image or color value H, a brightness value image or brightness value V or L, and a saturation image or saturation S. The brightness value image corresponds to the image of a conventional inspection device with a monochrome radiation source and allows conclusions to be drawn about local brightness contrasts.

These brightness contrasts may be due to foreign objects at the bottom of the inspected containers. The color value signal H can also be used for further evaluation. In addition to a disturbance in the brightness contrast, foreign objects should also exhibit local disturbances in the color contrast.

Therefore, if a local brightness contrast coincides with a local color contrast, the presence of a three-dimensional foreign object, such as a glass splinter, is detected by the evaluation device in this area. The saturation S can also be used to assess the significance of the color contrast signal.

The special evaluation device can also be used to identify structures such as chipped glass, which essentially cause no or only a low local brightness contrast but do cause a local color contrast. Chipped glass can be an indication of glass splinters in the container. Such containers should therefore not be placed on the market. Such chipped glass cannot usually be detected by conventional methods.

Suitable filter and classification methods are used for image evaluation.

A 360° inspection of containers can also be realized with the present method. Two inspection stations arranged one behind the other can be provided for this purpose. The containers, which are already conveyed on a transport device, are fed to these two inspection stations one after the other. Between the inspection stations, the containers are rotated by 90° during transportation. As a result, the containers are inspected in two orthogonal orientations.

The evaluation device can control the sorting out of containers depending on the inspection result. Containers in which a foreign object or chipped glass has been detected on the container bottom are preferably sorted out of the filling process via a reject device.

Disclosed embodiments also relate to a device for inspecting filled containers for foreign objects, comprising:

- a planar illumination device, the illumination device being configured to emit radiation which radiates through a container to be inspected,
- a detection device configured to detect the radiation which has been emitted by the illumination device and has radiated through the container, and to create an image of the container on the basis of the detected radiation, and
- an evaluation device configured to evaluate the image created by the detection device,
- wherein the detection device is aimed, at an acute angle relative to the horizontal, at the bottom area of the container to be inspected, and
- wherein a foreign object located at the bottom of the container is recognized as a local disturbance in the recorded image.

BRIEF DESCRIPTION OF THE DRAWINGS

In the following, disclosed embodiments are described in more detail by means of the accompanying drawings, wherein.

DETAILED DESCRIPTION

Figure 1:
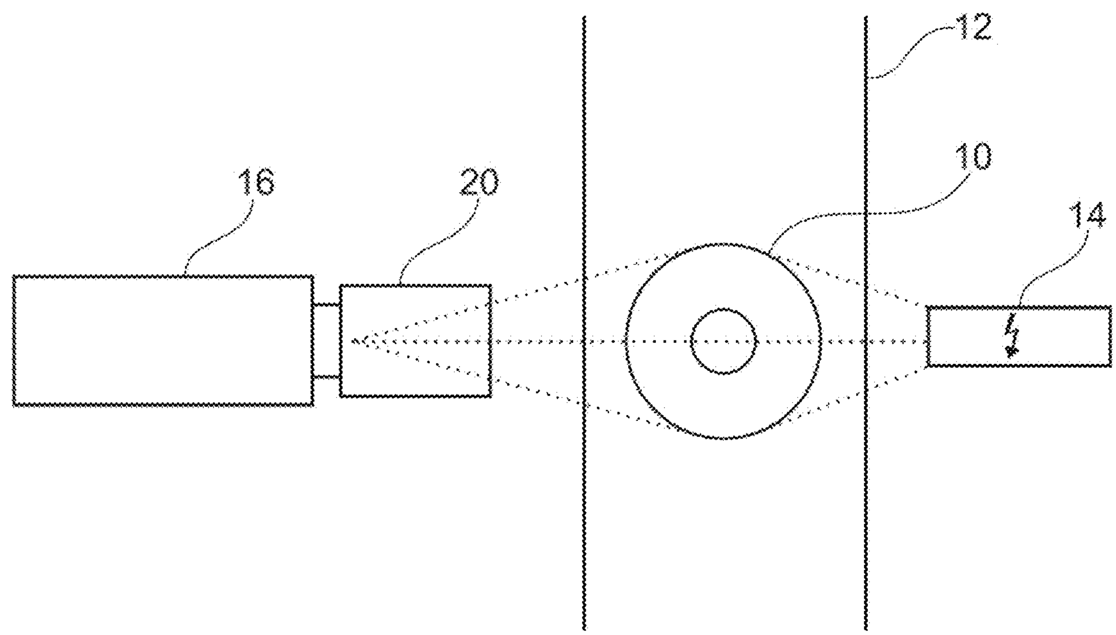
FIG. 1 is a top view of an inspection device according to the invention.

FIG. 1 shows a top view of the inspection device according to an embodiment. In the inspection device, containers 10 such as glass bottles are inspected for foreign objects. The containers 10 are conveyed through the inspection device on a transport device 12. A planar illumination device 14 and a detection device 16 are provided to identify the foreign objects. The radiation generated by the planar illumination device 14 is imaged by the filled container 10, which acts like a cylindrical lens, into the detection device 16. Since the illumination device 14 is narrower than the diameter of the container 10, only the radiation that has radiated through the container 10 is imaged into the detection device 16.

Figure 2:
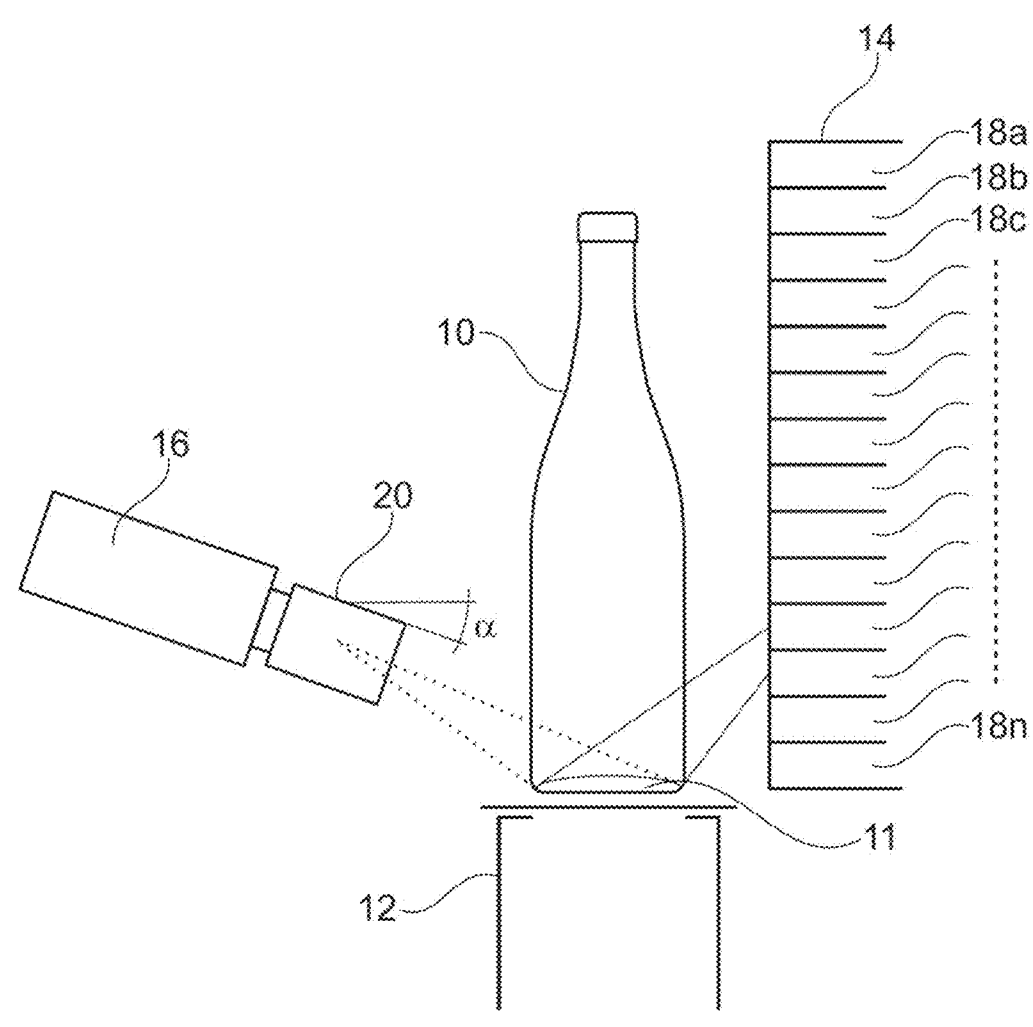
FIG. 2 is a side view of an inspection device according to the invention.

The planar illumination device 14 is designed to generate color-coded illumination. As indicated in the side view of FIG. 2, the illumination device 14 is horizontally segmented and has a striped pattern. The stripe pattern consists of strip-shaped illumination areas 18*a*-18*n* arranged one above the other. Each of these strip-shaped illumination areas 18 emits light of a different color.

The detection device 16 is a commercially available CCD camera. It is arranged at an acute angle α relative to the horizontal and points to the bottom area 11 of the container 10. The detection device 16 is designed so that only radiation from the direction of the container bottom 11 is detected. For this purpose, the detection device 16 is provided with a corresponding aperture 20.

Total reflection occurs at the container bottom 11 as the light beams exit the container, so that radiation from several illumination areas 18 is imaged into the detection device 16 from the entire container bottom 11.

In FIGS. 3 to 6, the beam path is explained schematically using a container 10, which has the shape of a conventional GdB bottle. In all FIGS. 3 to 6, the container 10 is located between a horizontally segmented illumination device 14 with 5 illumination areas 18*a-e* arranged one above the other and a detection device 16. The calculated beam path is shown for a plurality of exemplary incident beams 22.

Figure 3:
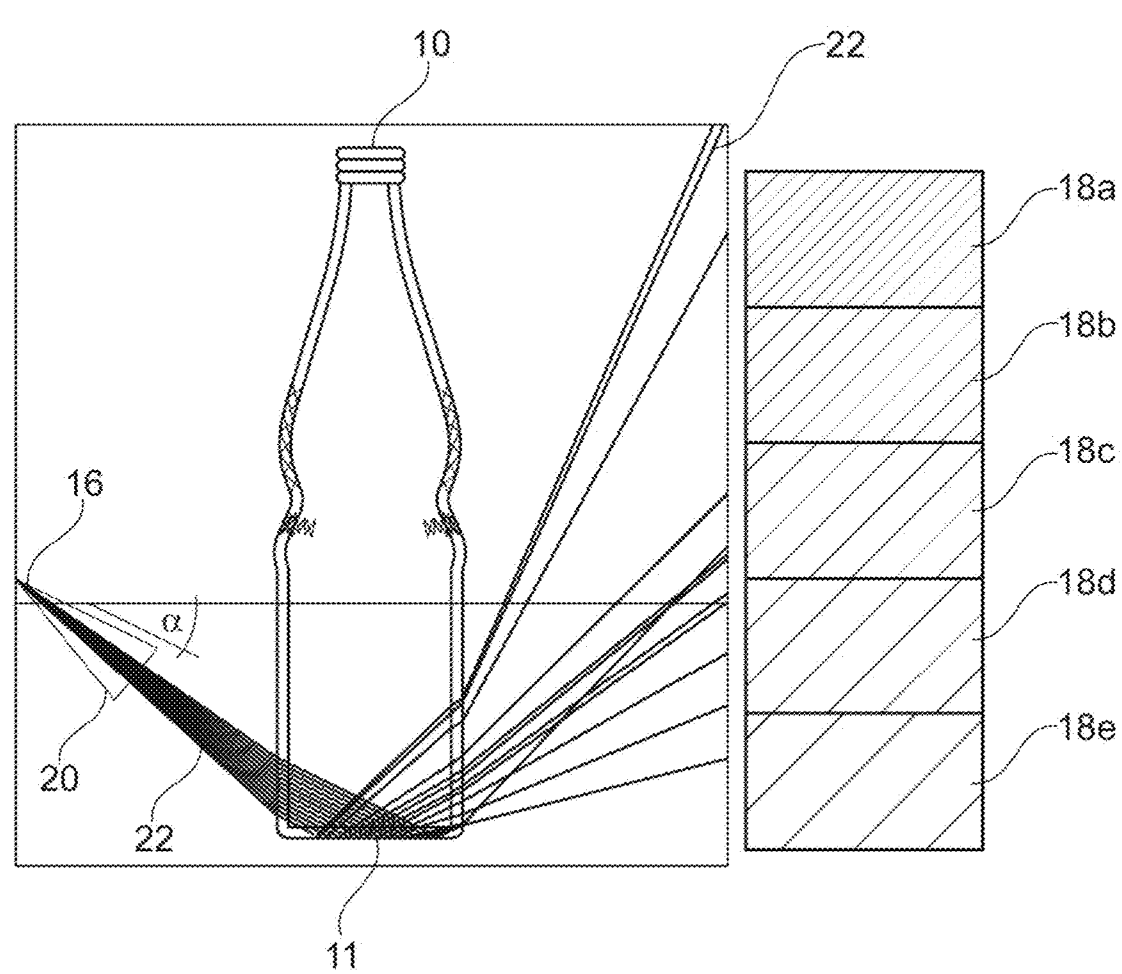
FIG. 3 shows a beam path in a filled glass bottle.

FIG. 3 shows the calculated beam path for a GdB bottle filled with water. As can be seen, with such a filled container, light from all the different illumination areas 18*a-e* is totally reflected at the container bottom 11 and imaged into the detection device 16. In such an image, the container bottom 11 appears as a bright area, because light from all the different illumination areas 18*a-e* is superimposed and imaged into the detection device 16.

Figure 4:
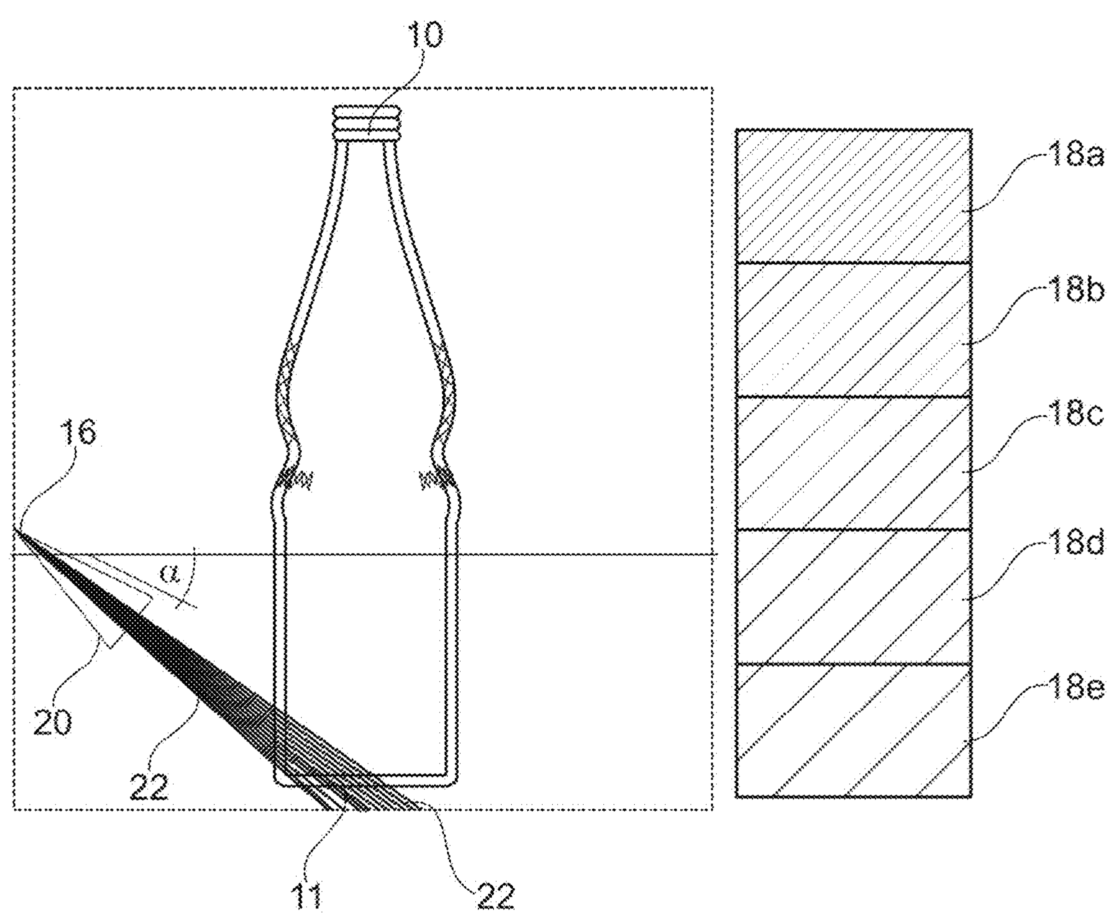
FIG. 4 shows a beam path in an empty glass bottle.

If there is no water in the container 10, total reflection does not occur. This situation is shown in FIG. 4. In this case, only radiation that is directed onto the container 10 from below the container bottom 11 would be imaged into the detection device 16. Such a beam path cannot be realized when using conventional transport devices 12 with plastic or metal chains, as these do not allow illumination from below.

Figure 5:
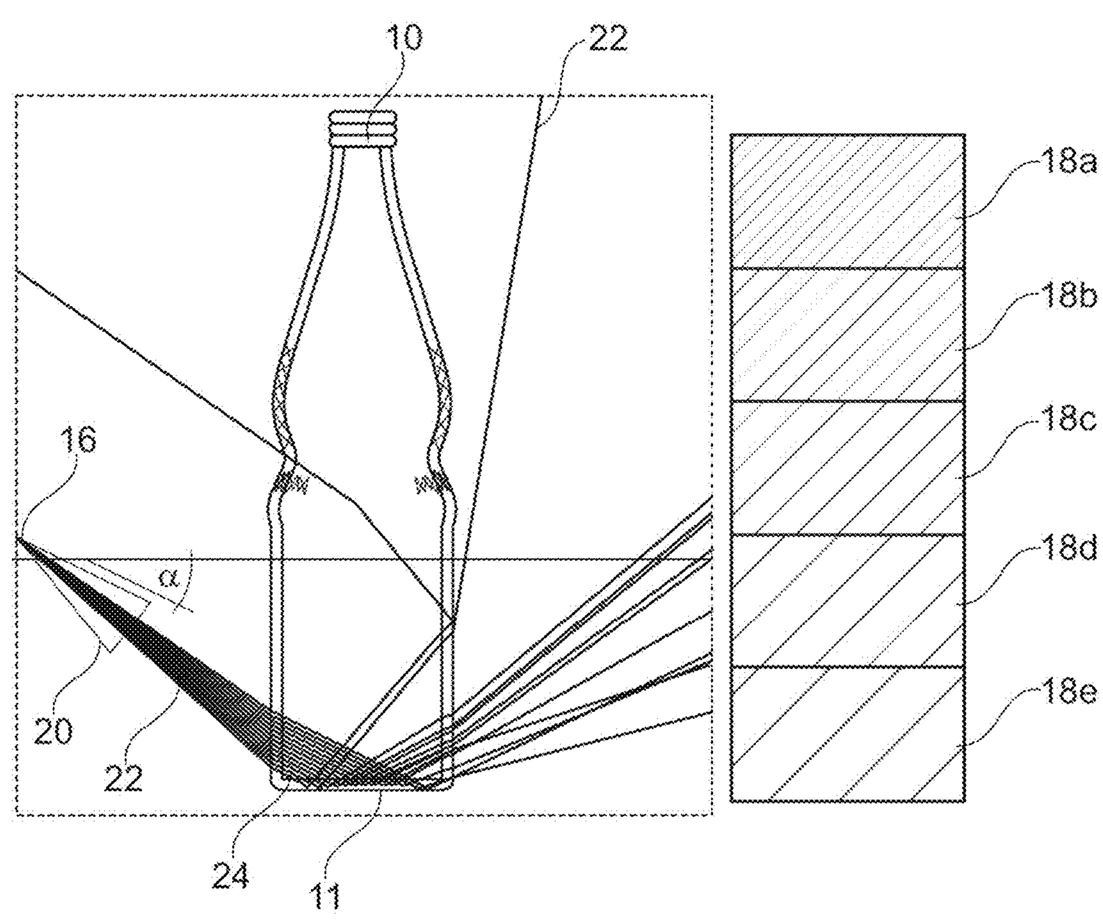
FIG. 5 shows a beam path in a filled glass bottle containing a cuboidal foreign object of the bottle's own glass.
Figure 6:
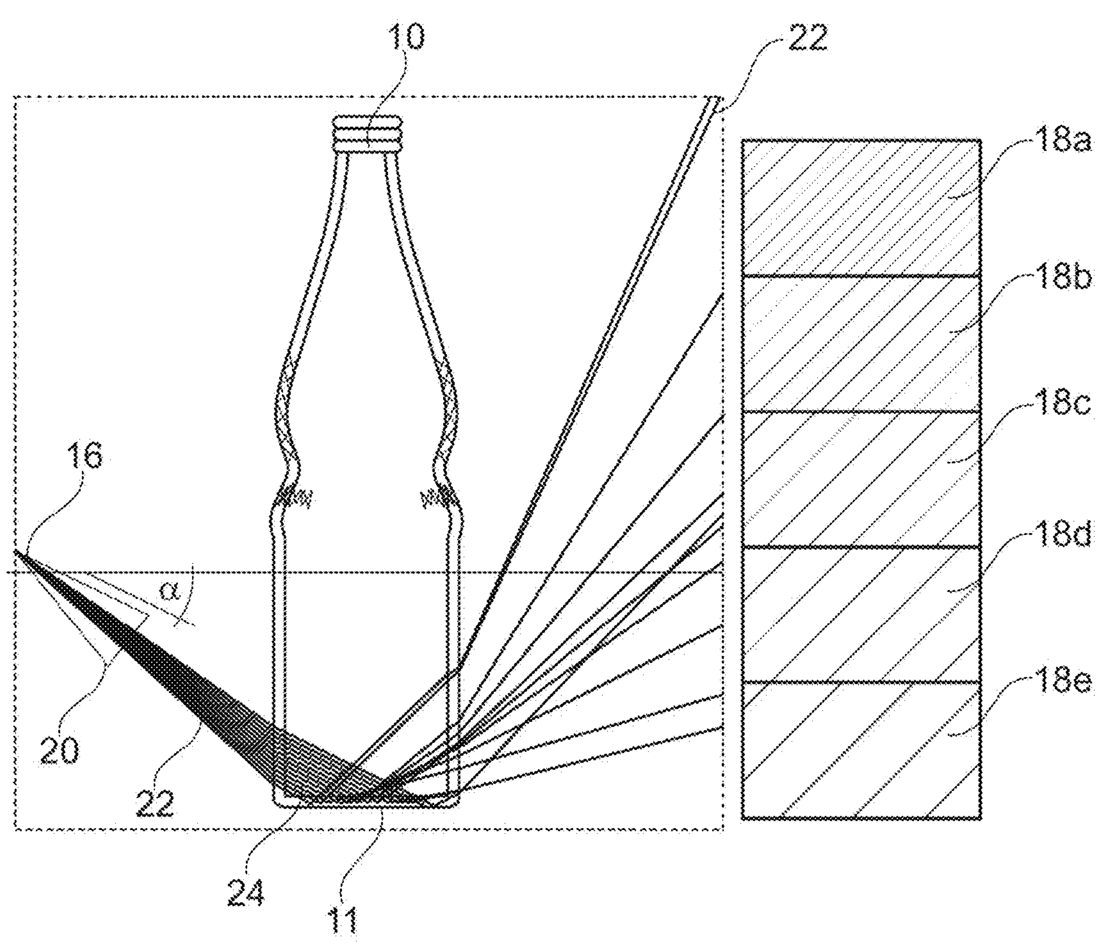
FIG. 6 shows a beam path in a filled glass bottle with a spherical foreign object of the bottle's own glass.

FIGS. 5 and 6 show the calculated beam path for a GdB bottle filled with water, with a cuboidal (FIG. 5) or a spherical (FIG. 6) foreign object 24 of the bottle's own glass located at the bottom of the container 11. In both cases, the refraction of light at the foreign object 24 changes the beam path so that light from other illumination areas 18 is imaged onto the detection device 16. This locally changes the color composition of the overall radiation that is imaged into the detection device 16. This color disturbance can be used to detect the foreign object 24.

Figure 7:
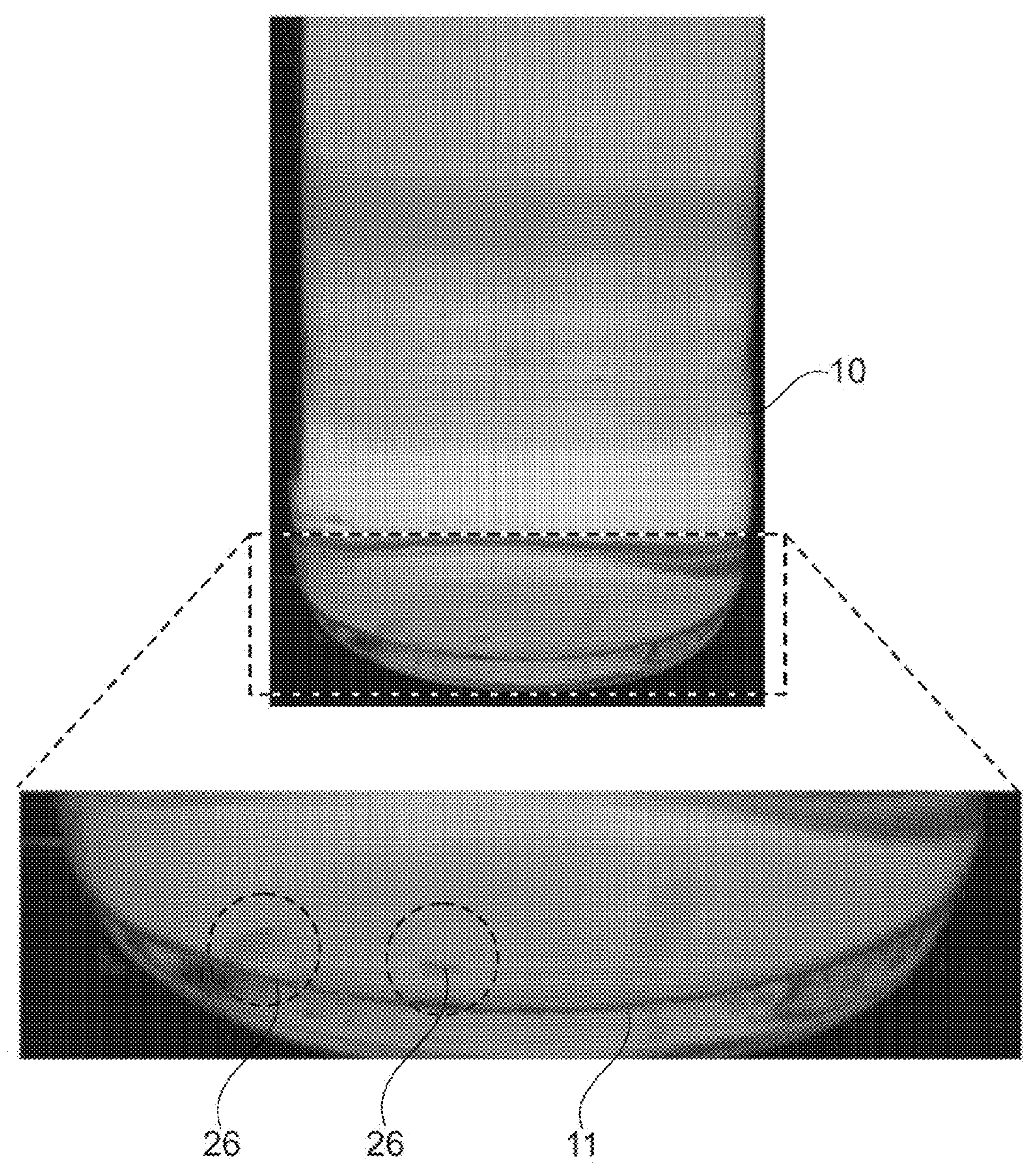
FIG. 7 is a color image of a container bottom with glass splinters.

FIG. 7 shows an image of a container 10 taken using the method according to an embodiment. The image shows two small pieces of broken glass 26, which can be seen as a clear disturbance of the local color space in the area of the container bottom 11. These pieces of broken glass 26 would not have been detectable with a conventional transmitted light method.

LIST OF REFERENCE NUMBERS

10 Container
11 Container bottom
12 Transport device
14 Illumination device
16 Detection device
18*a-k* Illumination areas
20 Aperture
22 Light beams
24 Foreign object(s)
26 Pieces of broken glass

The invention claimed is:

1. A method for inspecting filled containers for foreign objects, the method comprising:

providing a planar illumination device configured to emit radiation which radiates through a container to be inspected, providing a detection device configured to detect the radiation which has been emitted by the illumination device and has radiated through the container, and to create an image of the container on the basis of the detected radiation, providing an evaluation device configured to evaluate the image created by the detection device, wherein the detection device is aimed, at an acute angle $\alpha$ relative to the horizontal, at the bottom area of the container to be inspected, such that the radiation emitted by the illumination device is reflected by total internal reflection at the bottom area of the container to be inspected and is imaged by the detection device, and wherein a foreign object located on the container bottom is recognized as a local disturbance in the image.

2. The method according to claim 1, wherein the planar illumination device has a width which is smaller than the width or diameter of the containers to be inspected.

3. The method according to claim 1, wherein the height and/or the width of the emission surface of the illumination device are adjustable and can be adapted to the container size.

4. The method according to claim 1, wherein the planar illumination device contains areas with different emission characteristics.

5. The method according to claim 1, wherein the planar illumination device is configured to generate a color-coded illumination.

6. The method according to claim 1, wherein the planar illumination device comprises a plurality of individual radiation sources.

7. The method according to claim 1, wherein the individual radiation sources are LEDs, OLEDs, colored LEDs, IR or UV LEDs.

8. The method according to claim 1, wherein the illumination device is a beamer or a projector.

9. The method according to claim 1, wherein a plurality of images are recorded and the illumination device is controlled in such a way that an individual color pattern is generated for each image.

10. A device for inspecting filled containers for foreign objects, the device comprising:

a planar illumination device, the illumination device being configured to emit radiation which radiates through a container to be inspected, a detection device configured to detect the radiation which has been emitted by the illumination device and has radiated through the container, and to create an image of the container on the basis of the detected radiation, and an evaluation device configured to evaluate the image created by the detection device, wherein the detection device is aimed, such that the radiation emitted by the illumination device is reflected by total internal reflection at the bottom area of the container to be inspected and is imaged by the detection device, at an acute angle relative to the horizontal, at the bottom area of the container to be inspected, and wherein a foreign object located at the bottom of the container is recognized as a local disturbance in the recorded image.

* * * * *